United States Patent
Li et al.

(10) Patent No.: US 7,457,778 B2
(45) Date of Patent: Nov. 25, 2008

(54) METHOD AND ARCHITECTURE FOR FACILITATING PAYMENT TO E-COMMERCE MERCHANTS VIA A PAYMENT SERVICE

(75) Inventors: David Ching Li, San Jose, CA (US); David Young-June Kang, San Francisco, CA (US); Benjamin Gregg Listwon, Palo Alto, CA (US); Max R. Levchin, Palo Alto, CA (US)

(73) Assignee: eBay, Inc., San Jose, CA (US)

( * ) Notice: Subject to any disclaimer, the term of this patent is extended or adjusted under 35 U.S.C. 154(b) by 748 days.

(21) Appl. No.: 10/749,684

(22) Filed: Dec. 31, 2003

(65) Prior Publication Data

US 2005/0065881 A1 Mar. 24, 2005

Related U.S. Application Data

(60) Provisional application No. 60/456,504, filed on Mar. 21, 2003.

(51) Int. Cl.
*G06Q 40/00* (2006.01)

(52) U.S. Cl. ............... 705/39; 709/217; 709/218

(58) Field of Classification Search ............... None
See application file for complete search history.

(56) References Cited

U.S. PATENT DOCUMENTS

| | | | |
|---|---|---|---|
| 5,778,178 A | | 7/1998 | Arunachalam |
| 5,796,952 A | * | 8/1998 | Davis et al. ............... 709/224 |
| 5,931,917 A | | 8/1999 | Nguyen et al. |

(Continued)

FOREIGN PATENT DOCUMENTS

WO    WO-2004086190 A3    10/2004

OTHER PUBLICATIONS

Hurley, Nichole; Ragothaman, Srinivasan, An Empirical Analysis Of the Security Aspect Of E-business Payment Systems, Jun. 2002, South Dakota Business Review, vol. 60, No. 4, pp. 1, 4+.*

(Continued)

*Primary Examiner*—Alexander Kalinowski
*Assistant Examiner*—Virpi H Kanervo
(74) *Attorney, Agent, or Firm*—Schwegman, Lundberg & Woessner, P.A.

(57) ABSTRACT

Method and architecture for facilitating payment to e-commerce merchants via a payment service. The method enables consumer users of an electronic storefront hosted by a merchant to make purchases via the payment service, wherein interactions between the electronic storefront and the payment service are transparent to the user. In response to a user check-out request, the user's browser is directed to a payment service web site. Information from which authorization for use of the payment service may be determined is passed to the payment service. The payment service then returns the browser to a selected check-out flow hosted by the electronic storefront, wherein the check-out flow provides an option to use the payment service if the user and merchant are authorized to do so, otherwise the check-out flow does not include the payment service option. In one embodiment, an application program interface (API) provided by the payment service is employed by the electronic storefront to facilitate transactions with the payment service.

10 Claims, 4 Drawing Sheets

U.S. PATENT DOCUMENTS

| | | | |
|---|---|---|---|
| 5,983,208 A * | 11/1999 | Haller et al. | 705/40 |
| 5,987,500 A | 11/1999 | Arunachalam | |
| 6,047,268 A * | 4/2000 | Bartoli et al. | 705/35 |
| 6,058,373 A | 5/2000 | Blinn et al. | |
| 6,212,556 B1 | 4/2001 | Arunachalam | |
| 6,324,525 B1 | 11/2001 | Kramer et al. | |
| 6,535,880 B1 | 3/2003 | Musgrove et al. | |
| 6,728,767 B1 * | 4/2004 | Day et al. | 709/223 |
| 6,873,974 B1 * | 3/2005 | Schutzer | 705/41 |
| 7,035,817 B1 * | 4/2006 | Brothers | 705/27 |
| 7,072,856 B1 * | 7/2006 | Nachom | 705/26 |
| 7,072,859 B1 * | 7/2006 | Huber | 705/26 |
| 7,089,208 B1 * | 8/2006 | Levchin et al. | 705/39 |
| 7,110,399 B2 * | 9/2006 | Banerjee et al. | 370/389 |
| 7,191,151 B1 * | 3/2007 | Nosek | 705/39 |
| 7,254,549 B1 * | 8/2007 | Bansal et al. | 705/26 |
| 2001/0018747 A1 * | 8/2001 | Bouthors | 713/201 |
| 2001/0034658 A1 * | 10/2001 | Silva et al. | 705/26 |
| 2002/0016765 A1 * | 2/2002 | Sacks | 705/39 |
| 2002/0083178 A1 * | 6/2002 | Brothers | 709/226 |
| 2002/0107746 A1 * | 8/2002 | Jacoby, Jr. | 705/26 |
| 2002/0120567 A1 * | 8/2002 | Caplan et al. | 705/40 |
| 2002/0120568 A1 * | 8/2002 | Leblang et al. | 705/40 |
| 2002/0120714 A1 * | 8/2002 | Agapiev | 709/218 |
| 2002/0152163 A1 * | 10/2002 | Bezos et al. | 705/40 |
| 2002/0165821 A1 * | 11/2002 | Tree | 705/39 |
| 2003/0018587 A1 * | 1/2003 | Althoff et al. | 705/64 |
| 2003/0095660 A1 * | 5/2003 | Lee et al. | 380/231 |
| 2004/0078331 A1 * | 4/2004 | Fakih | 705/40 |
| 2004/0098313 A1 * | 5/2004 | Agrawal et al. | 705/26 |
| 2005/0240518 A1 * | 10/2005 | Ishizuka | 705/39 |

OTHER PUBLICATIONS

Dias, D. M., E-commerce Inoperability With IBM's WebSphere Commerce Products, Dec. 31, 2002, IBM Systems Journal, vol. 41, No. 2, p. 272.*

Brain, Marshall, "How Internet Cookies Work", http://computer.howstuffworks.com/cookie.htm, (2003),7 pgs.

"International Search Report, Application No. PCT/US04/08683, date mailed May 4, 2005", 10 Pages.

* cited by examiner

METHOD AND ARCHITECTURE FOR FACILITATING PAYMENT TO E-COMMERCE MERCHANTS VIA A PAYMENT SERVICE

CROSS-REFERENCE TO RELATED APPLICATION

The present application is based on a co-pending provisional application entitled "METHOD AND ARCHITECTURE FOR FACILITATING PAYMENT TO E-COMMERCE MERCHANTS VIA A PAYMENT SERVICE," Ser. No. 60/456,504, filed on Mar. 21, 2003, the benefit of the filing date of which is claimed under 35 U.S.C. § 119(e).

FIELD OF THE INVENTION

The field of invention relates generally to electronic commerce and, more specifically but not exclusively relates to a method and architecture that provides a mechanism for enabling e-commerce merchants to offer customer payments via a third party electronic payment service on an individual consumer basis.

BACKGROUND INFORMATION

The past decade has seen a tremendous growth in the use of the world-wide web for online purchases of products and services. Such products are available via web sites provided by e-commerce merchants, such as electronic retailers. Typically, an e-commerce web site is built around a set of web pages that collectively comprise an "electronic storefront." The web pages generally include an electronic catalog of product offered by the merchant (along with prices), and a product selection scheme that often corresponds to a "shopping cart model." Toward the end of a shopping "experience" the customer is presented with one or more pages corresponding to a "check out" or purchase transaction process. At this time, the customer usually is asked to enter payment information, such as a credit card number and billing address. In some instances, all or part of this information may have been stored during a previous visit and is recalled based on user identification, e.g., through a login process. After the payment information is entered, the customer is able to finalize the transaction via a confirmation action, such as activating a "confirm purchase" button displayed on a corresponding web page.

In most instances, the only payment mechanism offered by e-commerce merchants for retail customers is via credit cards. There are many reasons for this, including increasing the likelihood of receiving payment for the goods, fraud protection, and accounting simplicity. However, credit card payments do not come without a cost. On the merchant side, a transaction fee is subtracted by the credit card operator (e.g., bank) that typically includes a base amount plus a second amount based on a percentage of the overall purchase price (e.g., 1.5-2%). This leads to significant costs for larger merchants. From the consumer's perspective, there are also many drawbacks pertaining to credit card payments. Many consumers are weary about entering credit card information on-line, and thus may not make purchases from e-commerce merchants. Furthermore, many consumers prefer not to use credit cards for purchases, or do not have any credit cards to begin with. Accordingly, it would be advantageous to provide an alternative payment mechanism for both e-commerce merchants and consumers. Ideally, such an alternative payment mechanism should be easy to implement using existing network infrastructure.

SUMMARY OF THE INVENTION

In accordance with aspects of the present invention, a method and architecture for facilitating payment to e-commerce merchants via a payment service are provided. The method enables consumer users of an electronic storefront hosted by a merchant to make purchases via the payment service, wherein interactions between the electronic storefront and the payment service are transparent to the user. In response to a user check-out request, the user's browser is directed to a payment service web site. Information from which authorization for use of the payment service may be determined is passed to the payment service. The payment service then returns the browser to a selected check-out flow hosted by the electronic storefront, wherein the check-out flow provides an option to use the payment service if the user and merchant are authorized to do so, otherwise the check-out flow does not include the payment service option.

In another aspect of the present invention, an application program interface (API) provided by the payment service is employed by the electronic storefront to facilitate transactions with the payment service.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
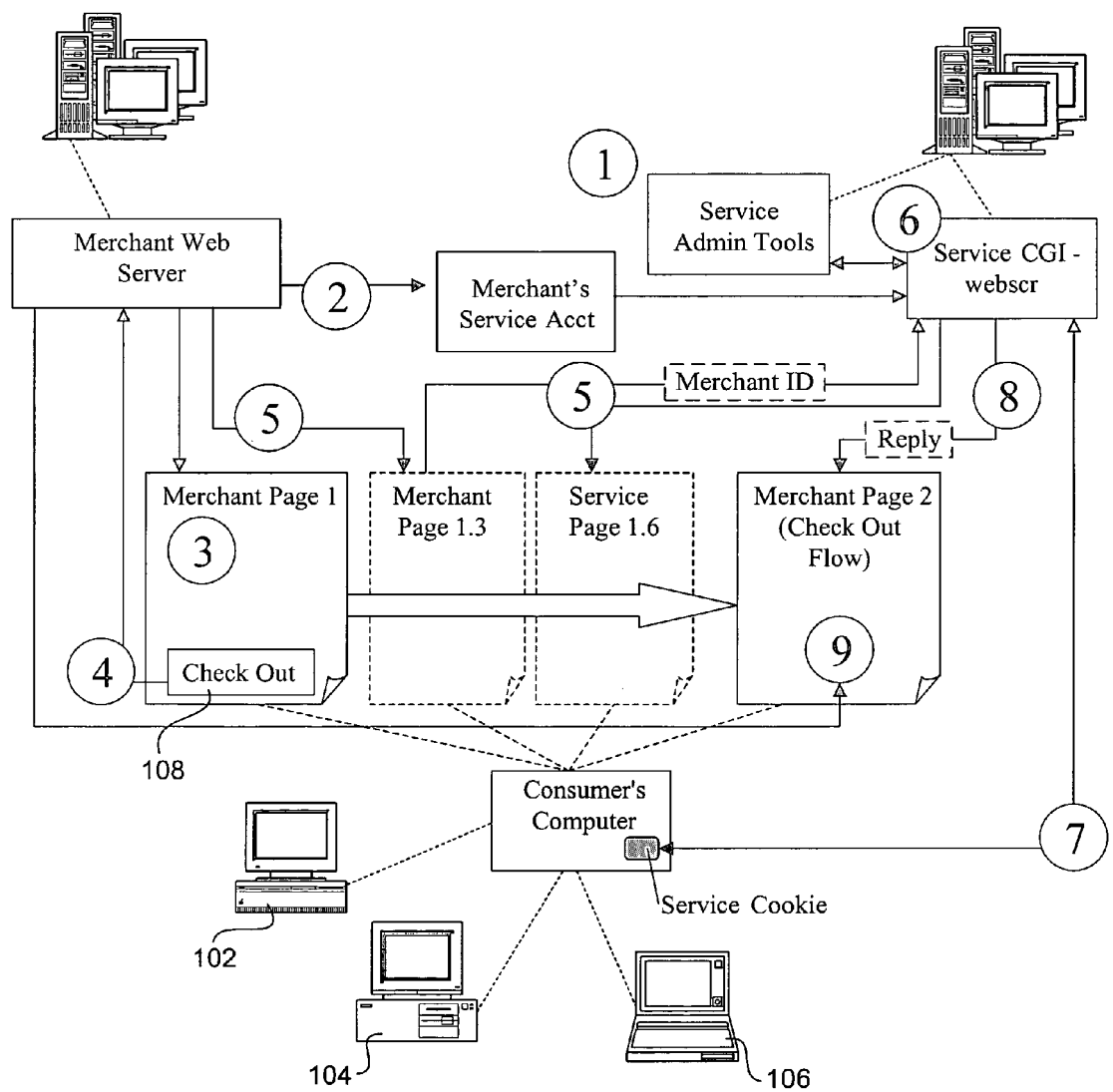
FIG. 1 is an architecture and network flow diagram corresponding to a first scheme for facilitating e-commerce merchant payment via a third-party payment service in accordance with one embodiment the invention.

Embodiments of methods and architectures for facilitating electronic payment of goods and services corresponding to on-line purchases are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the present invention, methods and architectures are disclosed herein for facilitating payment of goods and services via a third-party electronic payment service (i.e., the "payment service" or simply "service"). More particularly, the architectures provide efficient mechanisms for enabling payment of goods and services offered by e-commerce merchants via the payment service on an individual consumer basis. The mechanisms enable e-commerce merchants to easily add payment via the service as an option to authorized customers, and seamlessly integrate transactions via the payment service into the merchant's check out process. Furthermore, the architecture enables identification of consumers who are authorized to use the payment service without requiring the service to disseminate any customer lists or the like to e-commerce merchants that use the mechanisms.

In one embodiment, the mechanism is facilitated via an application program interface (API) and corresponding cookies relating to the API and use of the payment service. A service cookie is sent to the consumer's computer (and subsequently stored thereon) when the consumer logs into the payment service's website. For example, when a consumer signs up to use the payment service, a service cookie is sent back to the consumer's device (e.g., computer) to be stored on that device by a browser. The cookie is then used to facilitate future transactions via the service. Based on the existence of the service cookie, the service can determine whether the consumer has ever successfully logged into the service website. If an appropriate cookie has been sent to the consumer (actually the device), indicating the consumer is authorized to use the service, the service will advise the merchant, via the API, to allow the consumer to use the payment service for a current purchase. Accordingly, the merchant will present a checkout process congruent with the use of the service as a payment option.

Figure 2:
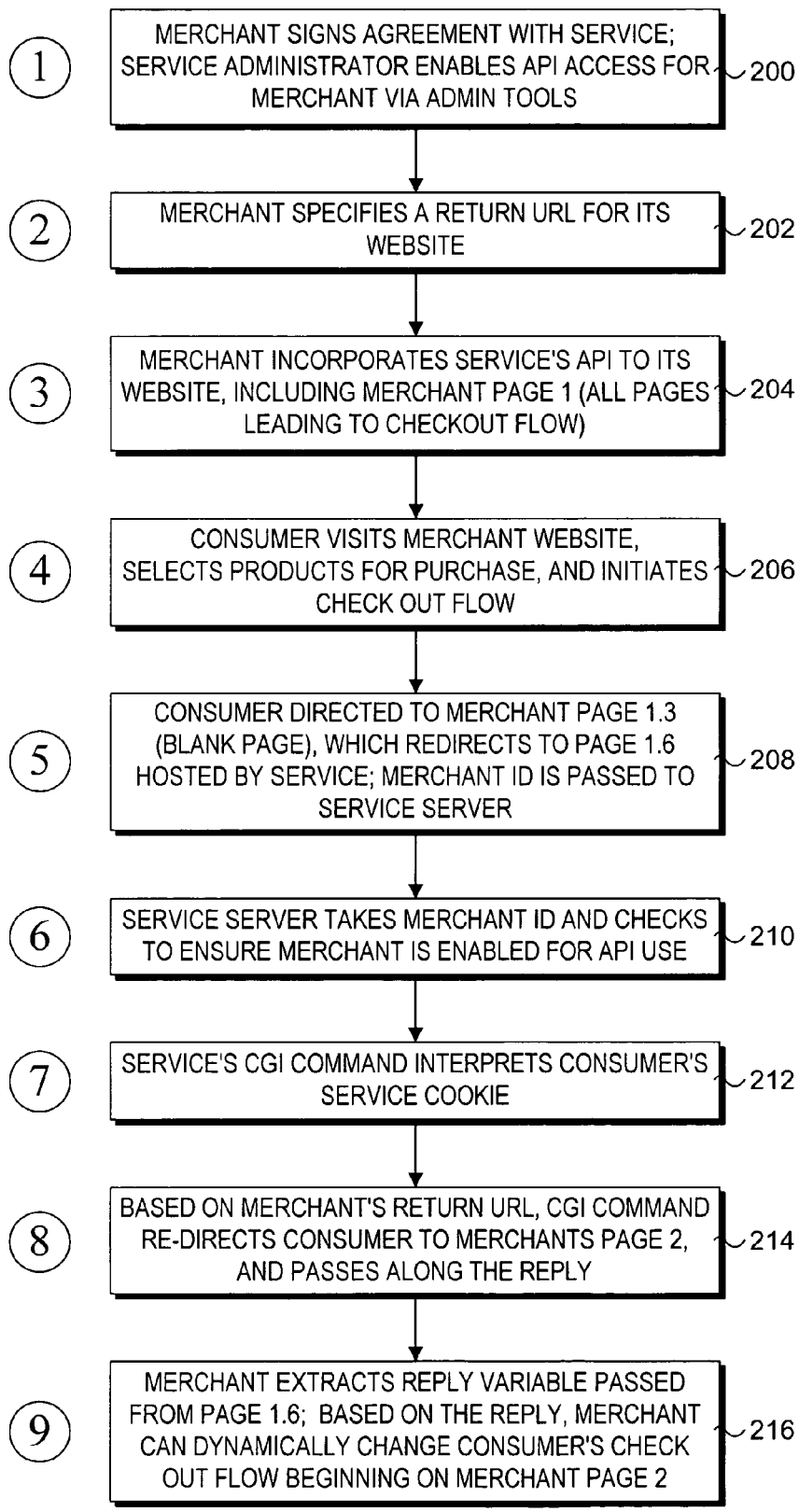
FIG. 2 is a flowchart illustrating further details of operations performed by the architecture of FIG. 1 during a consumer purchase from an e-commerce site.

An architecture and process flow diagram 100 corresponding to one embodiment of the invention is shown in FIG. 1, while a flowchart further describing the operations performed via the architecture is shown in FIG. 2. The process begins in a block 200 in which the merchant signs an agreement with the payment service to use the payment service API for facilitating consumer payment via the service. An administrator or the like at the payment service then enables the merchant for API access. In one embodiment the merchant is enabled for API access via an admin tool that is used to administrate user's accounts.

Figure 3:
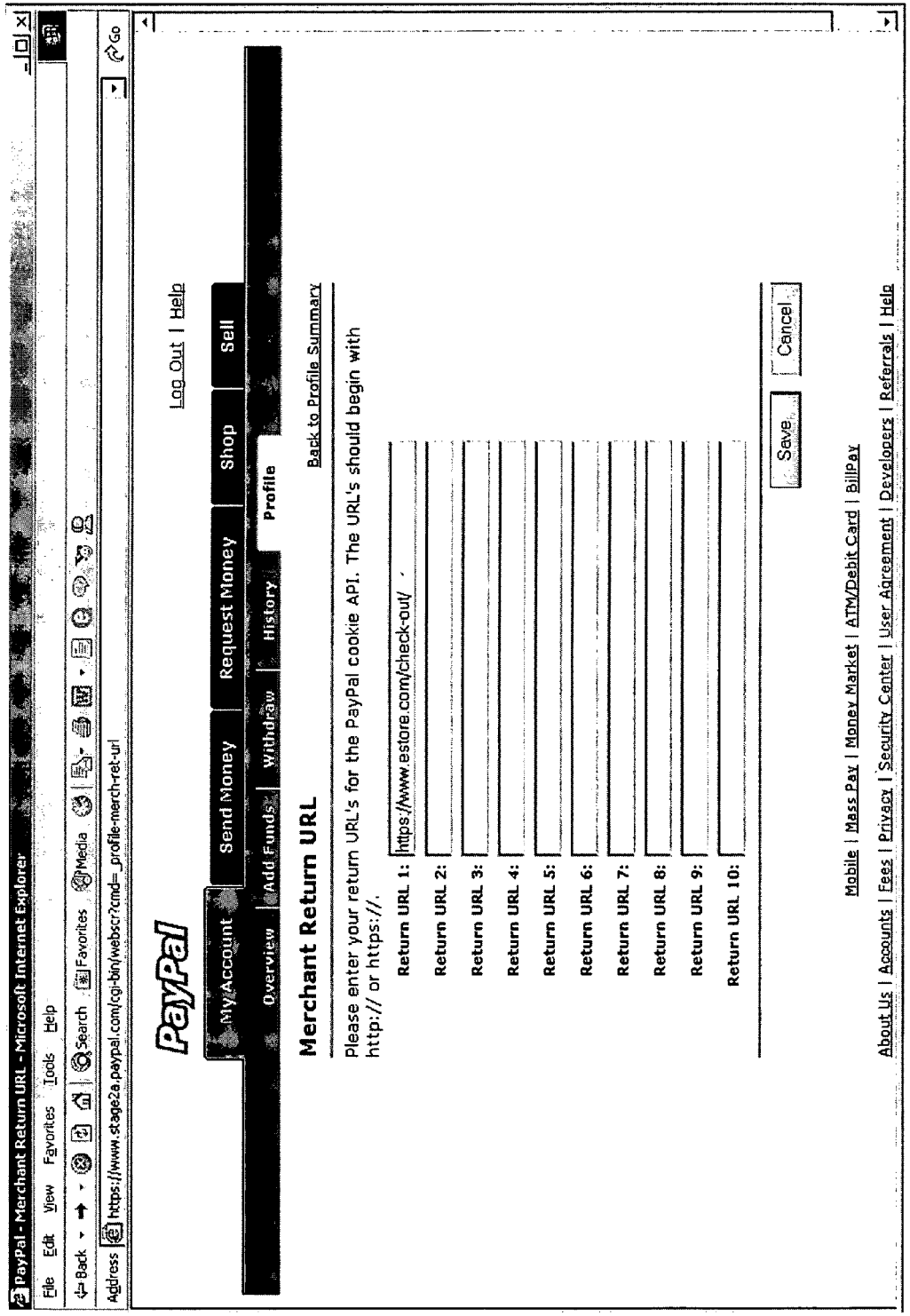
FIG. 3 shows a web page via which merchants are enabled to specify one or more URLs corresponding to web pages to which the consumer is redirected to during a purchase check out process.

Next, in a block 202, the merchant specifies a return URL for its website. In one embodiment user's of the payment service, including merchants, are enabled to provide one or more return URLs for respective sites operated by the merchant via a user profile page hosted by the service, such as depicted in FIG. 3. The merchant simply enters the URL address for each web page that merchant wants the flow to be re-directed from the payment service site, as described below in further detail.

The final step for enabling use of the API is completed when the merchant incorporates the payment service's API into appropriate web pages on its web site, as depicted by a block 204. These web pages will typically include one or more pages leading to a check out flow for the site. The one or more pages are collectively represented by merchant page 1 in FIG. 1—it will be understood that the provisions discussed below corresponding to merchant page 1 should be included in each of the web pages corresponding to the initial portion of a check out process. At this point, the merchant and service websites are configured to facilitate consumer payments via the payment service.

During subsequent ongoing operations, various consumers are enabled to provide payment for products purchased from the merchant via the payment service in the following manner. Generally, consumer's will access the merchant website via a web-enabled device, such as a Macintosh computer 102, personal computer (PC) 104, and laptop 106 depicted in FIG. 1. It is noted that these are merely exemplary web-enabled devices that consumer may use, with other devices including but not limited to PDA's, pocket PC's, web-enabled phones, workstations, etc. For clarity, augmentations to the network architecture for supporting non-HTML browsers, such as the micro-browsers used in PDA's and web-enabled phones, are not shown or discussed herein; infrastructure for extending web access to such devices are well-known in the art.

Continuing in a block 206, a consumer operating the web-enabled device, visits the merchant's website and selects one or more products for purchase, e.g., via "placing" the products in an electronic shopping cart. The consumer then initiates the site's check out process by activating an appropriate button displayed on Merchant page 1, such as a "Check Out" button 108. In response, a set of operations corresponding to blocks 208, 210, 212, and 214 are performed substantially instantly in a manner that is transparent to the consumer.

First, in block 208 the consumer (i.e., the browser on the consumer's device) is directed to merchant page 1.3, which comprises a blank page (with regard to visual content). Merchant page 1.3 is embedded with code to redirect the device's browser to page 1.6 hosted by the payment service. During this operation, information identifying the merchant (i.e., a merchant ID) is passed from the merchant's web server to the service's server. For example, in one embodiment, the browser is redirected to the service's server using a URL having the following format:

https://<service_web_address>/cgi-bin/
webscr?cmd=_user-
check&MID=X@Y.com&URL=http://www.Y.com/
cgi-bin/checkoutpg2 where <service_web_address> is the address for the payment service's home page, and "MID" is the merchant ID with the payment service, which in the current example comprises a primary email address (X@Y.com) of the merchant. "URL" is the return URL of the web page to where the consumer user is to be redirected to.

Upon receiving the merchant ID, the service server checks its user profile data to verify that the merchant is enabled for API use in block 210. In one embodiment, data embedded in the foregoing URL format provides a built-in security measure, wherein the MID and URL values are checked against user profile information for the merchant to authenticate the request. Accordingly, if the merchant decides to rename its "page 2" URL, the merchant will need to update the corresponding URL entered in the user profile above in connection with block 202 and FIG. 3. If the merchant is not enabled, an indicator is sent back to the merchant server indicating such via the reply discussed below.

Upon verifying that the merchant is enabled for API use, a CGI (common gateway interface) command (script) is executed on the service's server to interpret the consumer's service cookie. In conjunction with the redirect to service URL above, the browser on the consumer's device automatically forwards a copy of the cookie back to the service server. This is a process that is automatically performed by modern browser's that support cookies in response to being directed to a website that issued the cookie, and does not require any modification on the client (i.e., consumer device) side. In essence, a cookie is merely a pied of text that a web server sends to a client (e.g., a browser running on the consumer's device) to have stored on the client for subsequent use. Each cookie contains information comprising name-value pairs that may be used by the issuing web site during subsequent interactions with the site to transfer information to the site without requiring any action by the user. Typically, such information includes user ID's and the like.

Based on the merchant's return URL, the CGI command redirects the browser back to the merchant's web server to merchant page 2, which begins the augmented check out flow. In conjunction with this, a reply is passed to the server (e.g., embedded as a variable in a pre-formatted URL in one embodiment) that indicates whether or not the consumer is authorized to use the payment service. In one embodiment respective reply variable values are also used to indicate an authentication failure and a cookie cannot be interpreted.

The merchant server extracts the reply variable passed from service page 1.6 and dynamically changes the flow of the check out process beginning at merchant page 2. For example, if a cookie is not received from the consumer's device, the consumer is not authorized to use the payment service. Accordingly, the reply will indicate such, and the portion of the check out flow beginning with merchant page 2 will continue with a check out process that doesn't present the consumer with an option to pay via the payment service. In contrast, if the reply indicates the consumer is an authorized user, the merchant page 2 will lead to one or more subsequent pages (not shown) that will enable the user to pay for the purchase via the payment service. Typically, these pages will be coded by the merchant to fit the particular check-out process preferred by the merchant. Generally, the checkout process will perform a behind-the-scenes interaction with the payment service to complete a payment transaction in response to a consumer's authorization to pay for the product using the payment service. Further details of this process are known in the art, and, as such, are not disclosed herein.

The foregoing scheme provides an efficient mechanism for enabling e-commerce merchants to offer purchase payments via third-party payment services. This is advantageous to both the merchant and consumers. The cost associated with credit card transactions fees are eliminated for most payment service transactions. Like credit cards, payments issued by the payment services are trustworthy. Consumers also enjoy the benefit of being able to purchase products on-line in a secure manner that doesn't require disclosure of credit card information, or even require the consumer to possess a credit card.

Exemplary Server Computer System

Figure 4:
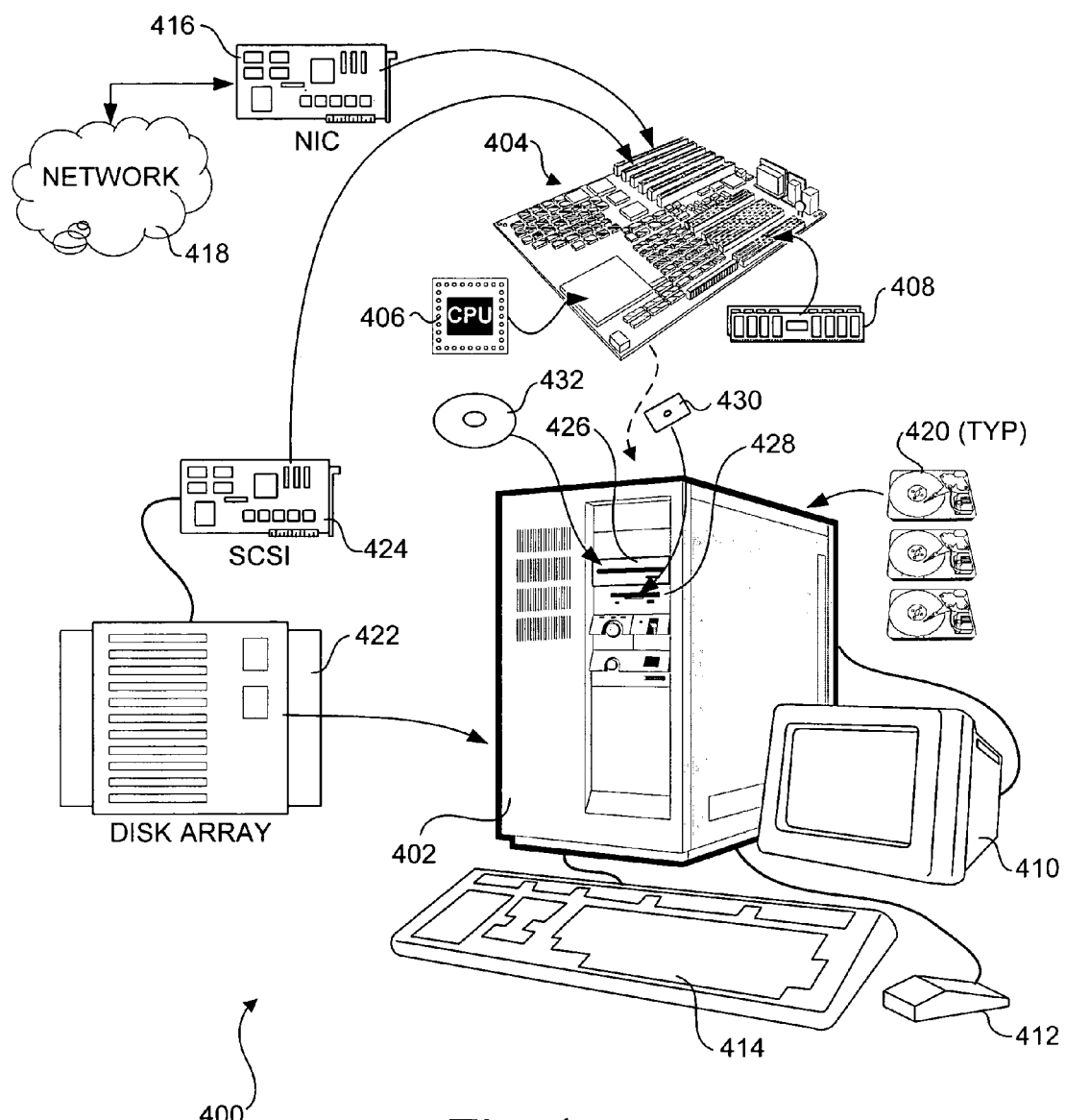
FIG. 4 is a schematic diagram illustrating a conventional computer server that is suitable for practicing embodiments of the invention disclosed herein.

With reference to FIG. 4, a generally conventional computer server 400 is illustrated, which is suitable for use in connection with practicing the embodiments of the present invention discussed above. For example, computer server 400 may be used for running software modules and components on the merchant web server and service server to facilitate the operations in the flow diagrams and flowcharts discussed above. Examples of computer systems that may be suitable for these purposes include stand-alone and enterprise-class servers operating UNIX-based and LINUX-based operating systems, as well as servers running the Windows NT or Windows 2000 Server operating systems.

Computer server 400 includes a chassis 402 in which is mounted a motherboard 404 populated with appropriate integrated circuits, including one or more processors 406 and memory (e.g., DIMMs or SIMMs) 408, as is generally well known to those skilled in the art. A monitor 410 is included for displaying graphics and text generated by software programs and program modules that are run by the computer server. A mouse 412 (or other pointing device) may be connected to a serial port (or to a bus port or USB port) on the rear of chassis 402, and signals from mouse 412 are conveyed to the motherboard to control a cursor on the display and to select text, menu options, and graphic components displayed on monitor 410 by software programs and modules executing on the computer. In addition, a keyboard 414 is coupled to the motherboard for user entry of text and commands that affect the running of software programs executing on the computer. Computer server 400 also includes a network interface card (NIC) 416, or equivalent circuitry built into the motherboard to enable the server to send and receive data via a network 418, such as the Internet, enabling the server to be connected to the world-wide web.

File system storage for storing server-side data, such as user profiles, electronic catalogs, CGI scripts, etc. may be implemented via a plurality of hard disks 420 that are stored internally within chassis 402, and/or via a plurality of hard disks that are stored in an external disk array 422 that may be accessed via a SCSI card 424 or equivalent SCSI circuitry built into the motherboard. Optionally, disk array 422 may be accessed using a Fibre Channel link using an appropriate Fibre Channel interface card (not shown) or built-in circuitry. Other hard disk interfaces may also be used.

Computer server 400 generally may include a compact disk-read only memory (CD-ROM) drive 426 into which a CD-ROM disk may be inserted so that executable files and data on the disk can be read for transfer into memory 408 and/or into storage on hard disk 420. Similarly, a floppy drive 428 may be provided for such purposes. Other mass memory storage devices such as an optical recorded medium or DVD drive may also be included. The machine instructions comprising the software components that cause processor(s) 406 to implement the operations of the embodiments discussed above will typically be distributed on floppy disks 430 or CD-ROMs 432 (or other memory media) and stored in one or more hard disks 420 until loaded into memory 408 for execution by processor(s) 406. Optionally, the machine instructions may be loaded via network 418 as a carrier wave file.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

serving a first web page via an electronic storefront containing visual content including a check-out option;

receiving a check-out request from a consumer user of the electronic storefront to purchase one or more products from the electronic storefront;

serving a second web page via the electronic storefront containing hidden content including information to redirect a browser client to a web page hosted by a payment service web site, redirection to the web page hosted by the payment service web site causing the browser client to communicate a service cookie, stored by the browser client, to the payment service web site;

extracting user identification information from the service cookie to determine an identify of the consumer user;

determining whether the consumer user is authorized to use the payment service via a check with a corresponding user profile;

determining whether the consumer user is authorized to use the payment service to make purchases from the electronic storefront;

storing information at the payment service web site, the information to redirect the browser client to the web page hosted by the payment service web site, the information including a return URL (uniform resource locator) corresponding to a third web page;

extracting the return URL embedded in the information;

comparing the return URL that is extracted to a return URL corresponding to the third web page to determine whether redirection to the third web page should be performed;

redirecting the browser client to the third web page, the third web page being hosted by the electronic storefront, the redirecting including:

serving a web-based check-out interface, hosted by the electronic storefront, to the browser client used by the consumer user, the check-out interface including an option to enable the consumer user to make a payment for the one or more products via the payment service if it is determined the user is authorized to use the payment service.

2. The method of claim 1, further comprising:

sending the service cookie containing information to identify the consumer user from the payment service to the browser client.

3. The method of claim 1, further comprising authenticating the electronic storefront with the payment service.

4. The method of claim 3, wherein the electronic storefront is authenticated by:

selecting a merchant identity (ID) for the electronic storefront to be used for transactions involving the payment service;

providing a merchant ID from the electronic storefront to the payment service; and comparing the merchant ID that is provided with the merchant ID that was selected to authenticate the user.

5. The method of claim 4, wherein the merchant ID is provided to the payment service via a URL (uniform resource locator).

6. The method of claim 1, further comprising generating the web-based check-out interface by employing an application program interface (API) that is provided to the electronic storefront by the payment service.

7. The method of claim 1, further comprising serving a web-based check-out interface to the browser client that does not include an option to enable the consumer user to make payment of the one or more products via the payment service if it is determined the user is not authorized to use the payment service to make purchases from the electronic storefront.

8. The method of claim 1, wherein the operation of determining whether the consumer user is authorized to use the payment service to make purchases from an electronic storefront is performed without the knowledge of the consumer user.

9. The method of claim 1, further comprising embedding information in the URL to the third web page indicating whether the user is authorized to use the payment service.

10. The method of claim 1, further comprising providing an interface to enable an administrator for the electronic storefront to register one or more return URLs with the payment service.

* * * * *

UNITED STATES PATENT AND TRADEMARK OFFICE
CERTIFICATE OF CORRECTION

PATENT NO.       : 7,457,778 B2                                   Page 1 of 1
APPLICATION NO.  : 10/749684
DATED            : November 25, 2008
INVENTOR(S)      : Li et al.

It is certified that error appears in the above-identified patent and that said Letters Patent is hereby corrected as shown below:

In column 7, line 23, in Claim 1, delete "identify" and insert -- identity --, therefor.

In column 7, line 25, in Claim 1, delete "the" and insert -- a --, therefor.

Signed and Sealed this

Twenty-fourth Day of February, 2009

JOHN DOLL
*Acting Director of the United States Patent and Trademark Office*